Feb. 5, 1957 H. G. HARRIS 2,780,160
THREE-POINT TOOL ADAPTER FOR TRACTORS
Filed Nov. 19, 1954
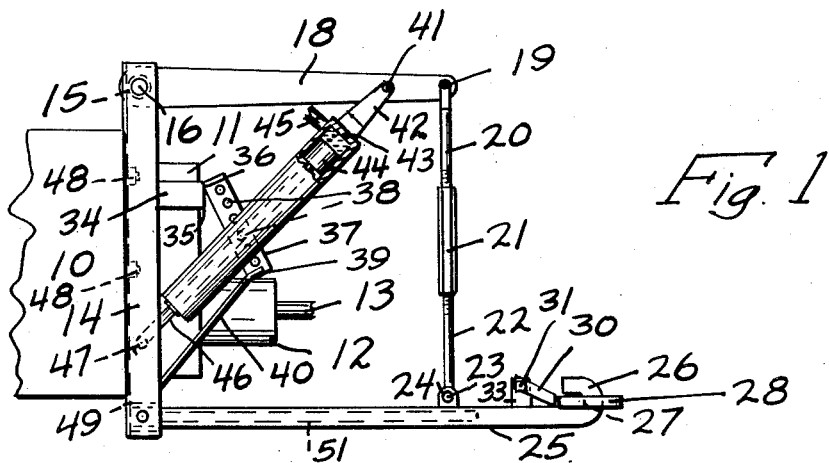
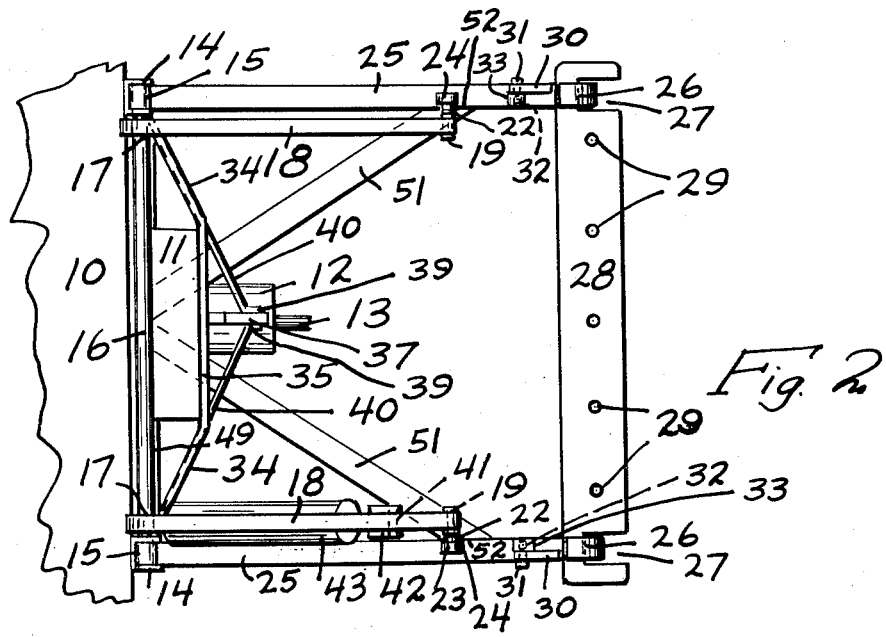
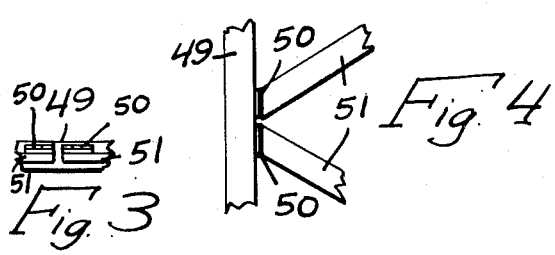
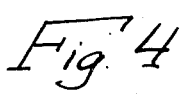
INVENTOR.
Howard G. Harris
BY
Sam J. Slotsky
ATTORNEY

United States Patent Office 2,780,160
Patented Feb. 5, 1957

2,780,160

THREE-POINT TOOL ADAPTER FOR TRACTORS

Howard G. Harris, Dakota City, Nebr.

Application November 19, 1954, Serial No. 470,078

2 Claims. (Cl. 97—46.59)

My invention relates to a tractor adapter.

An object of my invention is to provide an adapter for a certain type of tractor which will readily convert the tractor so that a three-point type of implement or tool can be attached thereto and operated therefrom.

A further object of my invention is to provide a unit of this type which is adjustable, and which will accommodate a variety of tools or implements.

A further object of my invention is to provide an auxiliary draw bar arrangement which is provided with the unit.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of my arrangement,

Figure 2 is a plan view of the device of Figure 1,

Figure 3 is a forward elevation of a detail, and

Figure 4 is a plan view of the device of Figure 3.

The purpose of my invention is to provide a framework which can be attached to a tractor of a certain type, and so that said framework will then accommodate the usual three-point type of tool, and will provide means for operating such tool.

I have used the character 10 to designate the rear portion of a tractor, the tractor including the further extending portion 11, the rear takeoff shaft housing 12 and the rear takeoff shaft 13.

The device of my invention includes a pair of vertically positioned spaced channel members 14 having the upper bearings 15 through which bearings pass the horizontal rod 16, to which are rigidly attached at 17, the rearwardly extending arms 18, the arms 18 being pivotally secured at 19 to the substantially vertically positioned rods 20, which rods engage the turn-buckle arrangements 21, which threadably engage the further threaded rods 22, which are pivotally attached at 23 to the lugs 24, which lugs 24 are secured to the lower arms 25.

The arms 25 terminate in the backwardly bent curled portions 26, which are received within the slots 27 of the flat horizontal draw bar member 28, which member 28 includes the spaced openings 29.

When it is desired to use the draw bar 28, it is securely locked in place by means of the small levers 30, which are tightly retained by means of the bolt 31 passing through these levers 30 and being threadably engaged at 32 with the lugs 33, which are also attached to the arms 25. It will be noted that by loosening the bolts 31, the lever members 30 can be swung upwardly so that the draw bar member 28 can be removed when such is desired.

Attached to the vertical channels 14 is a strap member having the angular portions 34 terminating in the horizontal portion 35, this arrangement being adapted to straddle the rear tractor portion 11, and welded at 36 to the portion 35 is the angularly inclined bar 37 having the spaced openings 38 therein, and attached at 39 to the lower end of the bar 37 are the angularly positioned bracing rods 40 which are also welded to the inner sides of the channels 14, it being noted that the lower end of the bar 37 also is securely supported by the casing 12.

Pivotally attached at 41 to one of the arms 18 is a forked member 42 which is rigidly secured to the top of the cylinder 43 having the piston 44 therein, the cylinder 43 including the tube 45 communicating thereto. The piston 44 is attached to a piston rod 46 which is suitably pivoted at 47 to one of the vertical channels 14.

The channels 14 are suitably secured to the rear of the tractor by means of the spaced nuts 48 which will attach the framework to the standard stud arrangements provided on the tractor. Attached across the bottom of the members 14 is a horizontal brace 49 (see Figures 3 and 4), and hinged at 50 to the brace 49 are the angularly extending further brace members 51, which brace members are welded at 52 to the arms 25.

The tube 45 communicates to any desired hydraulic oil source such as on the tractor for instance, and it will be noted that when oil is forced in through the tube 45 into the cylinder 43, the cylinder will rise with respect to the piston 44, and correspondingly the arms 18 will be raised, or pivoted on the rod 16. The implements or tools can be secured to any of the curled portions 26 by hooking thereon or attaching thereto in any suitable fashion, such implements being plows, or any other type of implement or tool commonly used with tractors. As explained above, the draw bar member 28 can be used also when desired with the openings 29 permitting convenient attachment thereto.

Any one of the openings 38 in the bar 37 can be used for making the third-point attachment of such tools, and it will therefore be noted that my device provides an arrangement which can be bolted to the rear of a tractor so that the three-point tool or implement can be attached thereto, and whereby also draw bar characteristics are provided.

It will be noted that the arms 25 can be adjusted vertically by means of the turn-buckle members 21, and it will be further noted that the hinging at 50 of the braces 51 provides means whereby the adjustment of either arm 25 can be made independently of the other arm, so that plow frameworks or other frameworks can be attached to the portions 26 so that any deviation in the framework can be accommodated as well.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tool adapter for tractors comprising a framework including a pair of vertically positioned spaced channels, a transverse rod journaled at the upper portion of said channels, upper arms secured to said rod, a hydraulic unit pivoted to one of said arms and to one of said channels for raising said arms, a pair of lower arms pivoted at the lower ends of said channels, means attached between said upper arms and said lower arms for raising said lower arms when said upper arms are raised, said means including adjustable threaded rods, turn-buckle members engaging said threaded rods, said lower arms having backwardly curled end portions for attaching implement portions thereto, a transverse draw bar plate having a plurality of openings therein, said plate having a pair of slots for receiving said curled portions, means for locking said plate including a pair of locking bars, lugs attached to said lower arms at which said locking bars are pivotally secured.

2. A tool adapter for tractors comprising a framework including a pair of vertically positioned spaced channels, a transverse rod journaled at the upper portion of said channels, upper arms secured to said rod, a hydraulic unit pivoted to one of said arms and to one of said channels for raising said arms, a pair of lower arms pivoted at the lower ends of said channels, means attached between said upper arms and said lower arms for raising said lower arms when said upper arms are raised, said means including adjustable threaded rods, turnbuckle members engaging said threaded rods, said lower arms having backwardly curled end portions for attaching implement portions thereto, a transverse draw bar plate having a plurality of openings therein, said plate having a pair of slots for receiving said curled portions, means for locking said plate including a pair of locking bars, lugs attached to said lower arms at which said locking bars are pivotally secured, a transverse strap member attached to said channels for straddling a tractor portion, a further bar attached to said strap member, means for bracing said further bar, said further bar having a plurality of openings therein for providing a third-point attachment thereto, means for attaching said channels to a tractor rear, brace members attached to said lower arms, a laterally positioned further brace member being attached to the bottoms of said channels, said brace members being hinged to said laterally positioned further brace member.

References Cited in the file of this patent

UNITED STATES PATENTS

| | | |
|---|---|---|
| 2,375,970 | Williams | May 15, 1945 |
| 2,445,145 | Love | July 13, 1948 |
| 2,462,726 | Currie | Feb. 22, 1949 |
| 2,597,692 | Wills et al. | May 20, 1952 |
| 2,629,306 | Rusconi | Feb. 24, 1953 |
| 2,667,745 | Smith et al. | Feb. 2, 1954 |
| 2,678,596 | Todd | May 18, 1954 |
| 2,691,932 | Sawyer et al. | Oct. 19, 1954 |